(12) United States Patent
Wu et al.

(10) Patent No.: US 6,846,533 B2
(45) Date of Patent: Jan. 25, 2005

(54) SHEETS MADE OF FILLED POLYMER COMPOSITIONS

(75) Inventors: Wen Pao Wu, Pittsford, NY (US); Alan E. Deyo, Rushville, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 10/200,371

(22) Filed: Jul. 22, 2002

(65) Prior Publication Data

US 2002/0197427 A1 Dec. 26, 2002

Related U.S. Application Data

(62) Division of application No. 09/850,985, filed on May 8, 2001.

(51) Int. Cl.[7] .......................... B29B 11/16; B29B 15/10
(52) U.S. Cl. .................................... 428/35.7; 428/36.92
(58) Field of Search ............................ 428/35.7, 36.92

(56) References Cited

U.S. PATENT DOCUMENTS

| | | | |
|---|---|---|---|
| 4,244,860 A | 1/1981 | Kuhnel et al. ............ 260/42.15 |
| 4,244,910 A | 1/1981 | Yui et al. ................ 264/328.12 |
| 4,461,871 A | 7/1984 | Kometani et al. ........... 525/166 |
| 4,491,553 A | 1/1985 | Yamada et al. ................ 264/51 |
| 4,524,512 A | 6/1985 | Formo et al. ................. 30/147 |
| 4,562,215 A | 12/1985 | Carter et al. ................. 523/220 |
| 4,915,611 A | 4/1990 | Brown ........................ 425/556 |
| 4,948,665 A | 8/1990 | Rosen ......................... 428/332 |
| 5,028,461 A | 7/1991 | Nakamichi .................. 428/34.5 |
| 5,079,287 A | 1/1992 | Takeshi et al. ............. 524/528 |
| 5,093,053 A | 3/1992 | Eckardt et al. ............. 264/45.1 |
| 5,124,193 A | 6/1992 | Sano et al. .................. 428/220 |
| 5,162,419 A | 11/1992 | Pottier-Metz et al. ....... 524/451 |
| 5,225,466 A | 7/1993 | Akao .......................... 524/108 |
| 5,484,824 A | 1/1996 | Abe et al. .................... 523/436 |
| 5,539,040 A | 7/1996 | Rohrmann ................... 524/425 |
| 5,723,527 A | 3/1998 | Sadatoshi et al. ........... 524/451 |
| 5,854,328 A | 12/1998 | Koizumi et al. ............. 524/451 |
| 5,920,845 A | 7/1999 | Risemberg ..................... 705/1 |
| 5,961,914 A | * 10/1999 | Mannion et al. ............. 264/544 |
| 5,973,049 A | 10/1999 | Bieser et al. ................ 524/425 |
| 6,011,102 A | 1/2000 | Shimojo et al. ............. 524/451 |
| 6,046,264 A | 4/2000 | Muller et al. ................ 524/407 |
| 6,071,462 A | 6/2000 | Putsch .................... 264/328.14 |
| 6,100,512 A | * 8/2000 | Neculescu et al. .......... 219/725 |

FOREIGN PATENT DOCUMENTS

| | | | |
|---|---|---|---|
| JP | 61032743 A | 2/1986 | ............. B32B/1/08 |
| JP | 04353404 A | 12/1992 | |

* cited by examiner

Primary Examiner—Sandra M. Nolan
(74) Attorney, Agent, or Firm—Jenkens & Gilchrist

(57) ABSTRACT

According to one embodiment, a container comprises a base. The base has a bottom wall and a continuous base wall which encompasses the bottom wall and extends upwardly therefrom. The base is made from a mixture of a polyolefin and a filler. The mixture is from about 30 to about 75 wt. % filler and from about 25 to about 70 wt. % polyolefin. A high aspect ratio filler and a low aspect ratio filler are included in the filler, with the high aspect ratio filler having an aspect ratio of at least 5:1 and the low aspect ratio filler having an aspect ratio of less than about 3:1. The filler comprises at least 50 wt. % of low aspect ratio filler.

24 Claims, 1 Drawing Sheet

SHEETS MADE OF FILLED POLYMER COMPOSITIONS

CROSS REFERENCE TO RELATED APPLICATION

This application is a divisional of U.S. patent application Ser. No. 09/850,985, filed May 8, 2001.

FIELD OF THE INVENTION

The present invention relates generally to packaging containers and sheets and, more particularly, to mineral-filled polyolefin food containers and sheets.

BACKGROUND OF THE INVENTION

The use of inexpensive plastic food packaging containers and sheets has become popular for dispensing and serving various food products. Generally, these food containers and sheets are typically made of a olefin polymer, such as polypropylene, or polyethylene, or a styrenic polymer such as polystyrene, including high impact polystyrene.

One drawback of the above materials for making plastic food packaging containers and sheets is the lack of sufficient flexural modulus coupled with good impact and good heat resistance (i.e., microwaveable). A material that lacks sufficient flexural modulus, polyethylene or polypropylene for instance, will require a much greater thickness to make the container or sheet functional from the rigidity point of view. The increase in material thickness, however, increases the cost of manufacturing. If a material has a low impact property, polystyrene, for instance, its resulting container or sheet is more brittle and, therefore, more likely to break during use than a container or sheet made with a material having a higher impact property. A sheet or container made with a material having a low heat resistance will result in the loss of modulus or stiffness at higher temperatures, making the container or sheet not functional.

By adding a mineral filler to the polyolefin, rigidity can be increased One filler widely used is talc. There are tradeoffs, however, in using talc as a filler. For example, the impact property of a talc-filled polyolefin container decreases as the wt. % of talc in the container or sheet increases. As mentioned above, a container or sheet with a low impact is brittle and can easily fracture or shatter upon dropping. Talc loading of greater than about 50 wt. % usually results in a composite which is too brittle to be used in most applications. For some applications, however, it is desirable to use more than 50 wt % filler because that decreases the cost of the container or sheet and makes the container or sheet more rigid.

Accordingly, a need exists for a container or sheet, such as a polyolefin container or sheet, that has a desirable flexural modulus while also having a desirable impact property and heat resistance.

SUMMARY OF THE INVENTION

According to one embodiment, a container that is adapted to hold food comprises a base. The base has a bottom wall and a continuous base wall, which encompasses the bottom wall and extends upwardly therefrom. The base is made from a mixture of a polyolefin and a filler. The mixture comprises from about 30 to about 75 wt. % filler and from about 25 to about 70 wt. % polyolefin. A high aspect ratio filler and a low aspect ratio filler are included in the filler, with the high aspect ratio filler having an aspect ratio of at least 5:1 and the low aspect ratio filler having an aspect ratio of less than about 3:1. The filler comprises at least 50 wt. % of low aspect ratio filler In another embodiment, a container that is adapted to hold food comprises a base having a bottom wall and a continuous base wall. The continuous base wall encompasses the bottom wall and extends upwardly therefrom. The base is made from a mixture of a polyolefin and a filler, while the filler includes a mixture of from about 20 to about 50 wt. % talc and from about 50 to about 80 wt. % calcium carbonate.

A third embodiment has a container adapted to hold food, which comprises a base. The base has a bottom wall and a continuous base wall. The continuous base wall encompasses the bottom wall and extends upwardly therefrom. The base is made from a mixture of a polymer and a filler, and the filler includes a mixture of from about 20 to about 50 wt. % of a first filler and from about 50 to about 80 wt. % of a second filler. The first filler is selected from talc, mica, wollastonite, or the combination thereof, while the second filler is selected from calcium carbonate, barium sulfate, or the combination thereof.

According to one embodiment, a sheet that is adapted to hold or carry food comprises a base The base is made from a mixture of a polyolefin and a filler The mixture comprises from about 30 to about 75 wt. % filler and from about 25 to about 70 wt. % polyolefin. A high aspect ratio filler and a low aspect ratio filler are included in the filler, with the high aspect ratio filler having an aspect ratio of at least 5:1 and the low aspect ratio filler having an aspect ratio of less than about 3:1 The filler comprises at least 50 wt. % of low aspect ratio filler.

In yet another embodiment, a sheet that is adapted to hold or carry food comprises a base. The base is made from a mixture of a polyolefin and a filler. The filler includes a mixture of from about 20 to about 50 wt. % talc and from about 50 to about 80 wt. % calcium carbonate.

Another embodiment includes a sheet adapted to hold food. The sheet comprises a base made from a mixture of a polymer and a filler. The filler includes a mixture of from about 20 to about 50 wt. % of a first filler and from about 50 to about 80 wt. % of a second filler. The first filler is selected from talc, mica, wollastonite, or combinations thereof, while the second filler is selected from calcium carbonate, barium sulfate, or combinations thereof

BRIEF DESCRIPTION OF THE DRAWINGS

The foregoing and other advantages of the invention will become apparent upon reading the following detailed description and upon reference to the drawings.

Figure 1:
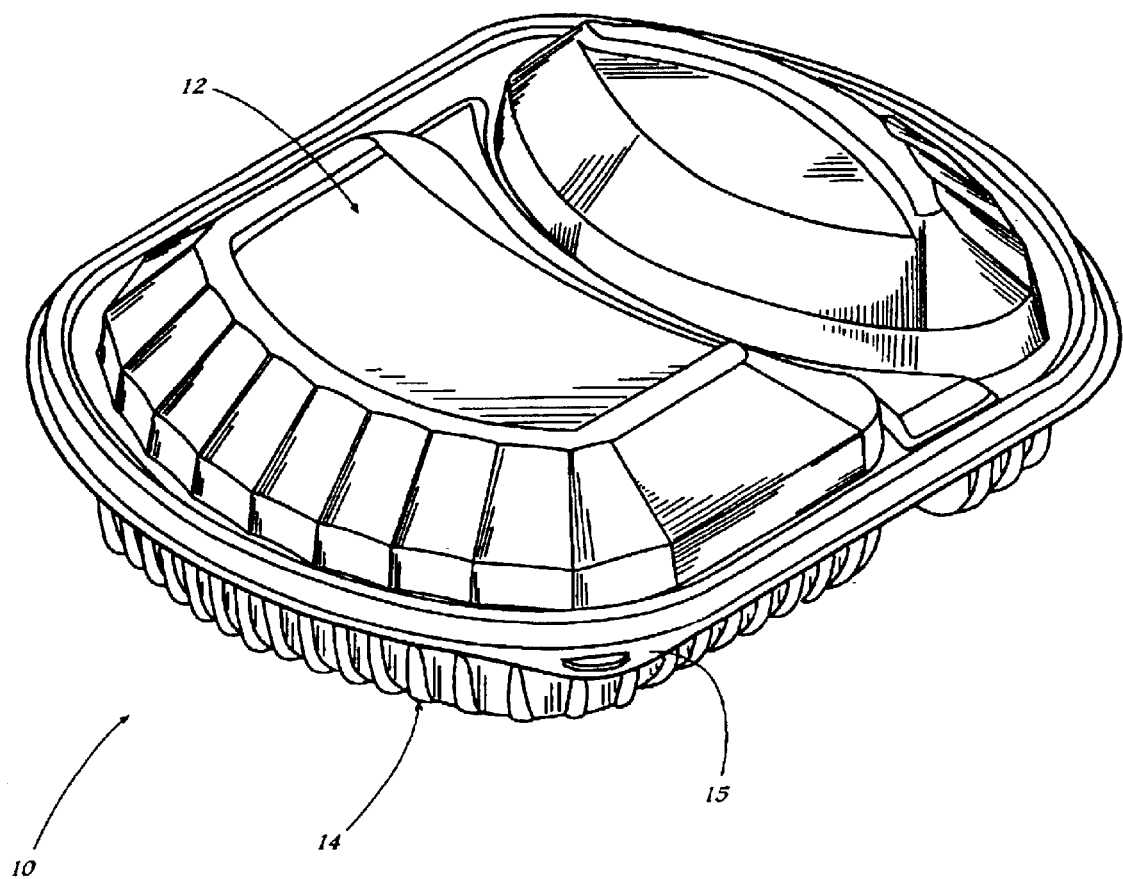
FIG. 1 is an isometric view of a plastic food container including an optional lid and a base according to one embodiment of the present invention.

While the invention is susceptible to various modifications and alternative forms, a specific embodiment has been shown by way of example in the drawing and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

According to one embodiment of the invention shown in FIG. 1, a multi-compartment container 10 comprises an optional cover or lid 12 and a base 14. The lid 12 may be adapted to releasably engage the base 14. The base 14 and the lid 12 may be releasably latched by a latching mechanism 15, such as that described in U.S. Pat. No. 5,758,791. It is contemplated that the container 10 of the present invention may be releasably latched by other known latching mechanisms, such as that shown in U.S. Pat. No. 5,607,709.

While the container 10 is depicted in FIG. 1 as being of a generally oval configuration, the invention herein disclosed is not intended to be limited thereto, but may take various other geometric shapes, such as circular and polygonal shapes. Likewise, the multi-compartment food container 10 may be a single-compartment container or a container having more than two compartments. In some embodiments, the container may not include a lid, and may just have a base with side walls, such as a plate or serving tray. In another embodiment, the invention is a sheet comprising only a base. For example, the sheet may also be a cutting board or placemat.

The container (or sheet) 10 of the present invention is comprised of a mixture of a polyolefin and a filler. A polyolefin includes polymers based on olefin monomers. Two examples of a polyolefin are polyethylenes and polypropylenes. The mixture comprises from about 25 to about 70 wt. % polyolefin. In another embodiment, the mixture comprises from about 35 to about 65 wt. % polyolefin.

The mixture comprises from about 30 to about 75 wt. % filler and, in one embodiment, from about 35 to about 65 wt. % filler. The filler itself is a mixture of a high aspect ratio filler and a low aspect ratio filler. The term "aspect ratio" of a particle is defined herein as a ratio of a largest dimension of the particle divided by a smallest dimension of the particle. The aspect ratios are determined by scanning under an electron microscope (2,000 times magnified) and visually viewing the outside surfaces of the particles to determine the lengths and thicknesses of the particles.

A high aspect ratio filler is defined as a filler having an aspect ratio of at least about 5:1. The high aspect ratio fillers of the present invention generally have an aspect of from about 5:1 to about 40:1, and preferably from about 10:1 to about 20:1. The high aspect filler may be talc, mica, wollastonite, or combinations thereof Commercially available talc materials include JETFIL® 575, available from Luzenac America of Englewood, Colo. Commercially available mica materials include SUZOREX® 325-PP, available from Zemex Industrial Minerals, Inc. Commercially available wollastonite include the NYGLOS® series of wollastonite, available from NYCO Minerals Inc. of Calgary, Alberta, Canada.

The low aspect ratio filler may be calcium carbonate, barium sulfate, or the combination thereof Commercially available calcium carbonate includes OMYACARB FT®, available from OMYA Inc. of Alpharetta, Ga. One example of commercially available barium sulfate is BARITE 2075®, available from Polar Minerals in Mentor, Ohio. A low aspect ratio filler is defined as being a filler having an aspect ratio of from 1:1 to about 3:1, preferably from 1:1 to about 2:1.

The filler mixture of the present invention comprises at least 50 wt. % low aspect ratio filler The filler mixture may be from about 50 to about 80 wt. % low aspect ratio filler and from about 20 to about 50 wt. % high aspect ratio filler.

A sheet to be used in forming a container may be made from the same materials discussed above in connection with the containers. The sheet to be used in forming a container has increased flexural modulus (rigidity), impact property, and tensile modulus. The increased flexural modulus is determined in accordance with ASTM D790, the increased impact property is determined in accordance with ASTM D5420-98a (Gardner Impact), and the tensile modulus is determined in accordance with ASTM D638. The flexural modulus of a sheet of the present invention is generally greater than about 350,000 pounds per square inch (psi), and preferably greater than about 400,000 psi, as determined by ASTM D790. The impact property of a sheet of the present invention is generally greater than about four inch-pounds (in-lbs) on a sheet of approximately 0.020 inches thick, preferably eight in-lbs, as determined by ASTM D5420-98a (Gardner Impact). The tensile modulus of a sheet of the present invention is generally greater than about 250,000 psi, and preferably greater than about 300,000 psi, as determined by ASTM D638.

The base 14 and the optional lid 12 may be formed using conventional thermoforming or injecting molding processes. According to one method of manufacturing, pellets of a polyolefin resin are melted in a twin screw extruder. Powders of the high aspect ratio filler and low aspect ratio filler are then added into the polyolefin melt to form a blend. The blend is extruded through a die to form an extruded sheet. The extruded sheet is then thermoformed to a desired shape of a container.

The thickness of the container may vary, but is typically from about 0.005 to about 0.250 inch. A preferable thickness is from about 0.010 to about 0.040 inch. The base 14 may be the natural color of the polyolefin/filler mixture, or a variety of colors or color combinations. The optional lid 12 may either be transparent, opaque, or a variety of colors. The height and shape of the lid 12 and/or the base 14 may vary from that shown without departing from the scope of the invention. The sheet used for serving, as a placemat or as a cutting board, may have a thickness from about 0.005 to about 0.040 inch. The sheet may be opaque or a variety of colors or color combinations.

EXAMPLES

The following examples are presented to demonstrate the flexural modulus, the tensile modulus, and the Gardner Impact of various polymer filled sheets. Examples 1–21 represent tests of seven different ratios of High Aspect Ratio (HAR) filler to Low Aspect Ratio (LAR) filler Each ratio was tested at three different weight percents of filler. The weight percent of filler varied in each test from about 35% to about 62%. The exact ratios and weight percents are shown in Table 1.

In each of the examples in Table 1, an HAR filler and an LAR filler were blended in the specified ratio with a drum tumbler to form a filler mixture. To create a filled polymer sheet, the polymer was fed at a controlled rate into the feed throat of a 34-mm co-rotating twin screw extruder, melted, and conveyed toward the melt pump at the end of the extruder. The filler mixture was then added to the melted polymer through a side-stuffer at zone 4 of a 9-zone twin screw extruder. The polymer/filler mixture was further melt-blended and extruded through a flat die into a sheet form of approximately 0.020 inches in thickness. Actual weight % filler was determined by performing an ash test or by calculation from the densities of the composite, the polymer, and the filler mixture with the following equation.

$$\text{Wt. \% filler} = [d_f \times (d_c - d_p)]/[d_c \times (d_f - d_p)] \times 100 \quad \text{Eq.(1)}$$

where $d_f$=density of the filler
$d_c$=density of the composite
$d_p$=density of the polymer Flexural moduli were determined from these sheets in accordance with ASTM D 790. Five specimens of each sample were tested in both the Machine Direction (MD) and the Transverse Direction (TD) and then averaged. Tensile moduli were determined from these sheets in accordance with ASTM D638. Five specimens cut in only the Machine Direction (MD) were tested and then averaged Gardner Impact Mean-Failure Energy (MFE) was determined from these sheets in accordance with ASTM D5420-98a.

TABLE 1

Mechanical Properties Of Mineral Filled Polypropylene[1]

| Example | Total Filler Level[2] (%) | HAR[3]/ LAR[4] ratio | Flexural Modulus (Kpsi) | Tensile Modulus (Kpsi) | Gardner Impact MFE (in-lbs) |
|---|---|---|---|---|---|
| Example 1 | 41.3 | 100/0 | 555 | 410 | 3 0 |
| Example 2 | 50.7 | 100/0 | 703 | 540 | 1 6 |
| Example 3 | 60.1 | 100/0 | 871 | 619 | 0 4 |
| Example 4 | 44 8 | 75/25 | 515 | 398 | 5.8 |
| Example 5 | 52 6 | 75/25 | 630 | 446 | 4.4 |
| Example 6 | 60 5 | 75/25 | 768 | 586 | 3.3 |
| Example 7 | 42.3 | 60/40 | 489 | 359 | 5.9 |
| Example 8 | 54 4 | 60/40 | 669 | 517 | 4.3 |
| Example 9 | 61.5 | 60/40 | 741 | 557 | 2.4 |
| Example 10 | 40.9 | 50/50 | 448 | 316 | 9.2 |
| Example 11 | 45.5 | 50/50 | 488 | 328 | 9.7 |
| Example 12 | 62 0 | 50/50 | 748 | 468 | 8 6 |
| Example 13 | 40.1 | 40/60 | 407 | 301 | 11.0 |
| Example 14 | 50 6 | 40/60 | 483 | 355 | 10.8 |
| Example 15 | 58.6 | 40/60 | 591 | 420 | 12.3 |
| Example 16 | 37 8 | 25/75 | 361 | 263 | 13.6 |
| Example 17 | 49.4 | 25/75 | 443 | 278 | 14.6 |
| Example 18 | 54 2 | 25/75 | 520 | 305 | 21.2 |
| Example 19 | 37.6 | 0/100 | 279 | 206 | 21.8 |
| Example 20 | 51 8 | 0/100 | 314 | 248 | 22 6 |
| Example 21 | 59.6 | 0/100 | 323 | 359 | 34.6 |

[1]PP homopolymer, melt flow rate (MFR) = 0.8.
[2]Filler level calculated based on Equation (1).
[3]High Aspect Ratio filler used was Luzenac JetFil ® 575 talc.
[4]Low Aspect Ratio filler used was OMYACarb ® FT calcium carbonate.

As shown in Table 1, for all the HAR/LAR ratios, as the total filler level increased, the flexural modulus and tensile modulus also increased. This is also beneficial since filler is less expensive than polyolefin and, therefore, the cost of manufacturing lessens. Also, it is shown that the higher the ratio of high impact ratio filler compared to low impact ratio filler, the higher the flexural modulus and tensile modulus of the tested sheets.

For Examples 1–9, the sheets have Gardner impact values that are relatively small and decreased as the amount of filler increased. As the low aspect ratio filler level increased to about 50% and above, however, the Gardner impact values surprisingly generally increased as the amount of filler increased. This is clearly shown in Examples 15 (as compared to Examples 13 and 14) and 18 (as compared to Examples 16 and 17). Sheets having a low aspect ratio filler of less than about 40 wt. % of the filler (Examples 1–9) produced a Gardner impact value that decreased as to the amount of filler increased (see, e.g., Examples 4–6), resulting in a sheet that was less desirable. Since filler is currently less expensive to manufacture than polyolefin, it is desirable to use a greater percentage of filler in the sheets. The Gardner impact values of Examples 1–9 were also not desirable due to their low values. A low Gardener impact value indicates a sheet that is more brittle and more likely to break during use.

Examples 10–18 (at low aspect ratio filler levels of about 50% and above) generally had Gardner impact values that surprisingly increased as the total filler level increased. Examples 10–18 generally provided compositions with a desirable combination of properties (flexural modulus, tensile modulus, and Gardner impact). The compositions of Examples 10–18 were also more economical at this time as compared to unfilled polyolefins because of the cost of filler as compared to polyolefins.

Examples 19–21 (without a high aspect ratio filler) had desirable Gardner impact values that also increased as the weight percent of filler increased. Examples 19–21, however, had lower flexural modulus and tensile modulus than is generally desired.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A sheet adapted to be formed into a container, said sheet comprising a mixture of a polyolefin and a filler, the mixture comprising from about 30 to about 75 wt. % filler and from about 25 to about 70 wt. % polyolefin, the filler includes a high aspect ratio filler and a low aspect ratio filler, the high aspect ratio filler having an aspect ratio of at least about 5:1 and the low aspect ratio filler having an aspect ratio of less than about 3:1, the filler comprising at least 50 wt. % of low aspect ratio filler.

2. The sheet of claim 1, wherein the sheet has a flexural modulus of at least 350,000 psi as determined by ASTM D790.

3. The sheet of claim 2, wherein the sheet has a tensile modulus of at least 300,000 psi as determined by ASTM D638.

4. A sheet comprising a base made from a mixture of a polyolefin and a filler, the mixture comprising from about 30 to about 75 wt. % filler and from about 25 to about 70 wt. % polyolefin, the filler includes a high aspect ratio filler and a low aspect ratio filler, the high aspect ratio filler having an aspect ratio of at least about 5:1 and the low aspect ratio filler having an aspect ratio of less than about 3:1, the filler comprising at least 50 wt. % of low aspect ratio filler.

5. The sheet of claim 4, wherein the high aspect ratio filler has an aspect ratio of from about 5:1 to about 40:1.

6. The sheet of claim 5, wherein the high aspect ratio filler has an aspect ratio of from about 10:1 to about 20:1.

7. The sheet of claim 4, wherein the low aspect ratio filler has an aspect ratio of from 1:1 to about 2:1.

8. The sheet of claim 4, wherein the filler comprises from about 50 to about 80 wt. % low aspect ratio filler and from about 20 to about 50 wt. % high aspect ratio filler.

9. The sheet of claim 4, wherein the high aspect ratio filler is talc, mica, wollastonite, or combinations thereof.

10. The sheet of claim 9, wherein the high aspect ratio filler is talc.

11. The sheet of claim 4, wherein the low aspect ratio filler is calcium carbonate, barium sulfate, or the combination thereof.

12. The sheet of claim 11, wherein the low aspect ratio filler is calcium carbonate.

13. The sheet of claim 4, wherein the polyolefin is a polypropylene, a polyethylene, or combinations thereof.

14. The sheet of claim 13, wherein the polyolefin is a polypropylene.

15. The sheet of claim 14, wherein the polyolefin is a polypropylene homopolymer.

16. The sheet of claim 14, wherein the polyolefin is an impact copolymer polypropylene.

17. The sheet of claim 4, wherein the mixture comprises from about 35 to about 65 wt. % filler and from about 35 to about 65 wt. % polyolefin.

18. A sheet comprising a base made from a mixture of a polyolefin and a filler, wherein the filler includes a mixture of from about 20 to about 50 wt. % talc and from about 50 to about 80 wt. % calcium carbonate.

19. The sheet of claim 18, wherein the polyolefin is a polypropylene, a polyethylene, or combinations thereof.

20. The sheet of claim 19, wherein the polyolefin is a homopolymer polypropylene.

21. The sheet of claim 19, wherein the polyolefin is an impact copolymer polypropylene.

22. A sheet comprising a base made from a mixture of a polymer and a filler, wherein the filler includes a mixture of from about 20 to about 50 wt. % of a first filler and from about 50 to about 80 wt. % of a second filler, the first filler being selected from talc, mica, wollastonite, or combinations thereof, and the second filler being selected from calcium carbonate, barium sulfate, or combinations thereof.

23. The sheet according to claim 22, wherein the first filler is talc.

24. The sheet according to claim 22, wherein the second filler is calcium carbonate.

\* \* \* \* \*